(12) United States Patent
Miura (10) Patent No.: US 8,573,978 B2
(45) Date of Patent: Nov. 5, 2013

(54) DRIVING EVALUATION SYSTEM AND DRIVING EVALUATION METHOD

(75) Inventor: Naoki Miura, Toyokawa (JP)

(73) Assignee: Aisin AW Co., Ltd., Anjo (JP)

( * ) Notice: Subject to any disclaimer, the term of this patent is extended or adjusted under 35 U.S.C. 154(b) by 375 days.

(21) Appl. No.: 12/458,446

(22) Filed: Jul. 13, 2009

(65) Prior Publication Data

US 2010/0047744 A1 Feb. 25, 2010

(30) Foreign Application Priority Data

Aug. 21, 2008 (JP) ................................ 2008-212757

(51) Int. Cl.
*G09B 9/04* (2006.01)

(52) U.S. Cl.
USPC ................... 434/66; 434/62; 434/64; 434/65; 340/905

(58) Field of Classification Search
USPC ..................... 701/35, 117; 434/65, 66, 62, 64
See application file for complete search history.

(56) References Cited

U.S. PATENT DOCUMENTS

| | | | | |
|---|---|---|---|---|
| 2005/0131597 A1* | 6/2005 | Raz et al. | ......................... | 701/29 |
| 2005/0182538 A1* | 8/2005 | Phelan et al. | .................... | 701/35 |
| 2006/0267296 A1* | 11/2006 | Dodd et al. | ................ | 280/5.512 |
| 2008/0071465 A1* | 3/2008 | Chapman et al. | ............. | 701/117 |
| 2008/0293450 A1* | 11/2008 | Ryan et al. | .................. | 455/556.2 |
| 2009/0043486 A1* | 2/2009 | Yang et al. | ..................... | 701/117 |
| 2009/0091439 A1 | 4/2009 | Sekiyama et al. | | |
| 2010/0207787 A1* | 8/2010 | Catten et al. | ................... | 340/905 |
| 2010/0274435 A1* | 10/2010 | Kondoh et al. | ................. | 701/29 |
| 2011/0106370 A1* | 5/2011 | Duddle et al. | .................. | 701/33 |

FOREIGN PATENT DOCUMENTS

| | | | |
|---|---|---|---|
| CN | 1983240 | A | 6/2007 |
| CN | 101002239 | A | 7/2007 |
| CN | 101074020 | A | 11/2007 |
| CN | 101228546 | A | 7/2008 |
| JP | A-2006-209455 | | 8/2006 |
| JP | 2007-293626 | * | 8/2007 |
| JP | A-2007-293626 | | 11/2007 |

OTHER PUBLICATIONS

Jul. 17, 2013 Search Report issued in Application No. 200910167346X (with Translation).

* cited by examiner

*Primary Examiner* — Nikolai A Gishnock
*Assistant Examiner* — Randall N Crenwelge
(74) *Attorney, Agent, or Firm* — Oliff & Berridge, PLC (57) ABSTRACT

Systems, method, and programs evaluate a driving condition of a vehicle in accordance with road characteristic information that is included in map data, acquire evaluation information that includes an evaluation result based on the evaluation, and store the evaluation information. The systems, methods, and programs acquire update data to change the road characteristic information included in the map data, update the map data, and analyze the evaluation result for the evaluation information acquired during the period between the time when a road characteristic is modified and the time when the map data is updated, based on the changed road characteristic information included in the updated map data.

13 Claims, 7 Drawing Sheets

| LINK NUMBER | NODE NUMBER | ROAD CLASS | ROAD LENGTH | ROAD WIDTH | SHAPE INTERPOLATION POINT | TRAFFIC REGULATION |
|---|---|---|---|---|---|---|
| k1 | n1-n2 | ……… | ……… | ……… | ……… | ……… |
| k2 | n1-n4 | ……… | ……… | ……… | ……… | MAXIMUM SPEED 50 KM/H |
| k3 | n2-n3 | ……… | ……… | ……… | m1-m9 | STOP POINT AT LINK END OF NODE n3 SIDE |
| k4 | n3-n4 | ……… | ……… | ……… | ……… | ……… |

FIG. 4B

| LINK NUMBER | NODE NUMBER | ROAD CLASS | ROAD LENGTH | ROAD WIDTH | SHAPE INTERPOLATION POINT | TRAFFIC REGULATION |
|---|---|---|---|---|---|---|
| k1 | n1-n2 | ……… | ……… | ……… | ……… | ……… |
| k2 | n1-n4 | ……… | ……… | ……… | ……… | MAXIMUM SPEED 60 KM/H |
| k3 | n2-n3 | ……… | ……… | ……… | p1-p9 | STOP POINT AT LINK END OF NODE n3 SIDE |
| k4 | n3-n4 | ……… | ……… | ……… | ……… | ……… |

| LINK NUMBER | MODIFICATION TIMESTAMP | MODIFICATION CONTENT | |
|---|---|---|---|
| k2 | 2008/8/3 0:00 | TRAFFIC REGULATION | MAXIMUM SPEED: 60 KM/H |
| k3 | 2008/7/31 0:00 | SHAPE INTERPOLATION POINT | p1-p4 |

FIG. 7

| ID NUMBER | EVALUATION DATE/TIME | POSITION COORDINATES | PARAMETER | EVALUATION RESULT |
|---|---|---|---|---|
| AAA | 2008/8/2 20:00 | (x1,x1) | SPEED LIMIT COMPLIANCE | SPEEDING (20 KM/H): 7-POINT DEDUCTION |
| BBB | 2008/8/4 10:00 | (x2,x2) | DECELERATION BEFORE CURVE | EXCESSIVE SPEED AT CURVE ENTRY: 3-POINT DEDUCTION |
| CCC | 2008/8/4 10:00 | (x3,x3) | STOP COMPLIANCE | STOP IGNORED: 5-POINT DEDUCTION |
| DDD | 2008/8/7 7:30 | (x4,x4) | SUDDEN ACCELERATION AVOIDANCE | SUDDEN ACCELERATION: 2-POINT DEDUCTION |
| EEE | 2008/8/9 19:00 | (x5,x5) | SPEED LIMIT COMPLIANCE | SPEEDING (15 KM/H): 5-POINT DEDUCTION |

DRIVING EVALUATION SYSTEM AND DRIVING EVALUATION METHOD

INCORPORATION BY REFERENCE

The disclosure of Japanese Patent Application No. 2008-212757 filed on Aug. 21, 2008 including the specification, drawings and abstract is incorporated herein by reference in its entirety.

BACKGROUND OF THE INVENTION

1. Field of the Invention

The present invention relates to a driving evaluation system that evaluates a driving condition associated with a predetermined parameter related to safe driving or environmentally friendly driving, and a driving evaluation method and a computer-readable medium that practices a driving evaluation program.

2. Description of the Related Art

There are commonly known driving evaluation systems that evaluate a driving condition associated with a predetermined parameter related to safe driving or environmentally friendly driving. For example, a driving evaluation system described in Japanese Patent Application Publication No. JP-A-2007-293626 evaluates whether a driver is practicing safe driving based on parameters such as following distance and observance of the speed limit, and then assigns safety points to the driver in accordance with the evaluation result. The driving evaluation system similarly evaluates whether the driver is practicing environmentally friendly driving manner based on parameters such as vehicle fuel consumption, and then assigns environmental points to the driver in accordance with the evaluation result. In this driving evaluation system, the evaluation regarding whether the driver is practicing safe driving (and the evaluation regarding whether the driver is practicing environmentally friendly driving) is mainly performed based on map data pertaining to speed limits, stop locations and the like, which are stored in a map database provided in the driving evaluation system.

SUMMARY OF THE INVENTION

Road networks are one of the essential elements forming the foundation of transport and change on a daily basis. New roads (including general roads and expressways) are constantly being built and existing roads expanded. Consequently, the shapes and classes of roads and road characteristics such as the speed limit also change on a daily basis. The map data stored in the map database are also updated accordingly. However, some time is required to create data for updates. Accordingly, there is generally a lag between the time when a road characteristic is modified and the time when the map data is updated to incorporate the modified road characteristic in the map data. Therefore, depending on the timing, the road characteristic and the road characteristic information stored with the map data in the map database may differ with regard to a particular location.

If the driver is traveling under such circumstances on a road that has been modified, the driving evaluation system described in Japanese Patent Application Publication No. JP-A-2007-293626 evaluates the driving condition based on map data that does not reflect the modified road characteristic. Therefore, according to the driving evaluation system described JP-A-2007-293626, driving in compliance with the modified road characteristic may result in an invalidated evaluation when the evaluation is based on outdated map data.

The present invention provides art that suppresses an invalid evaluation due to time lags when updating map data.

A driving evaluation system according to a first aspect of the present invention includes: an evaluation information acquisition unit that evaluates a driving condition of a vehicle in accordance with road characteristic information that is included in map data, and acquires evaluation information that includes an evaluation result based on the evaluation; an evaluation information storage unit that stores the evaluation information; a map updating unit that acquires update data to change the road characteristic information included in the map data, and updates the map data; an analysis unit that analyzes the evaluation result for the evaluation information acquired during the period between the time when the road characteristic is modified and the time when the map data is updated, based on the changed road characteristic information included in the updated map data.

Note that in the present invention, the term "road characteristic" is used as a general concept that expresses various types of qualities pertaining to roads, such as a shape and class of the road, a traffic regulation for the road, and the arrangement of features on and around the road.

According to the above configuration, the evaluation information is stored in the evaluation information storage unit. Once the map data is updated to incorporate the modified road characteristic in the map data, following a predetermined period after the road characteristic is modified, the evaluation information acquired during the predetermined period is analyzed based on the road characteristic information included in the updated map data. Therefore, invalid evaluations due to the time lag in updating the map data may be easily discovered. If an invalid evaluation is discovered, the evaluation information associated with the invalid evaluation may be corrected to suppress the invalid evaluation caused by the time lag.

The driving evaluation system according to a first aspect of the present invention with the above configuration may also be applied to a driving evaluation method and a driving evaluation program. Accordingly, the present invention includes in its scope such a method and program.

In such case, the driving evaluation program evaluates a driving condition of a vehicle in accordance with road characteristic information that is included in map data, and acquires evaluation information that includes an evaluation result based on the evaluation; stores the evaluation information; acquires update data to change the road characteristic information included in the map data, and updates the map data; and analyzes the evaluation result for the evaluation information acquired during the period between the time when a road characteristic is modified and the time when the map data is updated, based on the changed road characteristic information included in the updated map data.

This driving evaluation program may also incorporate the operation and effects of the driving evaluation system described above.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Figure 1:
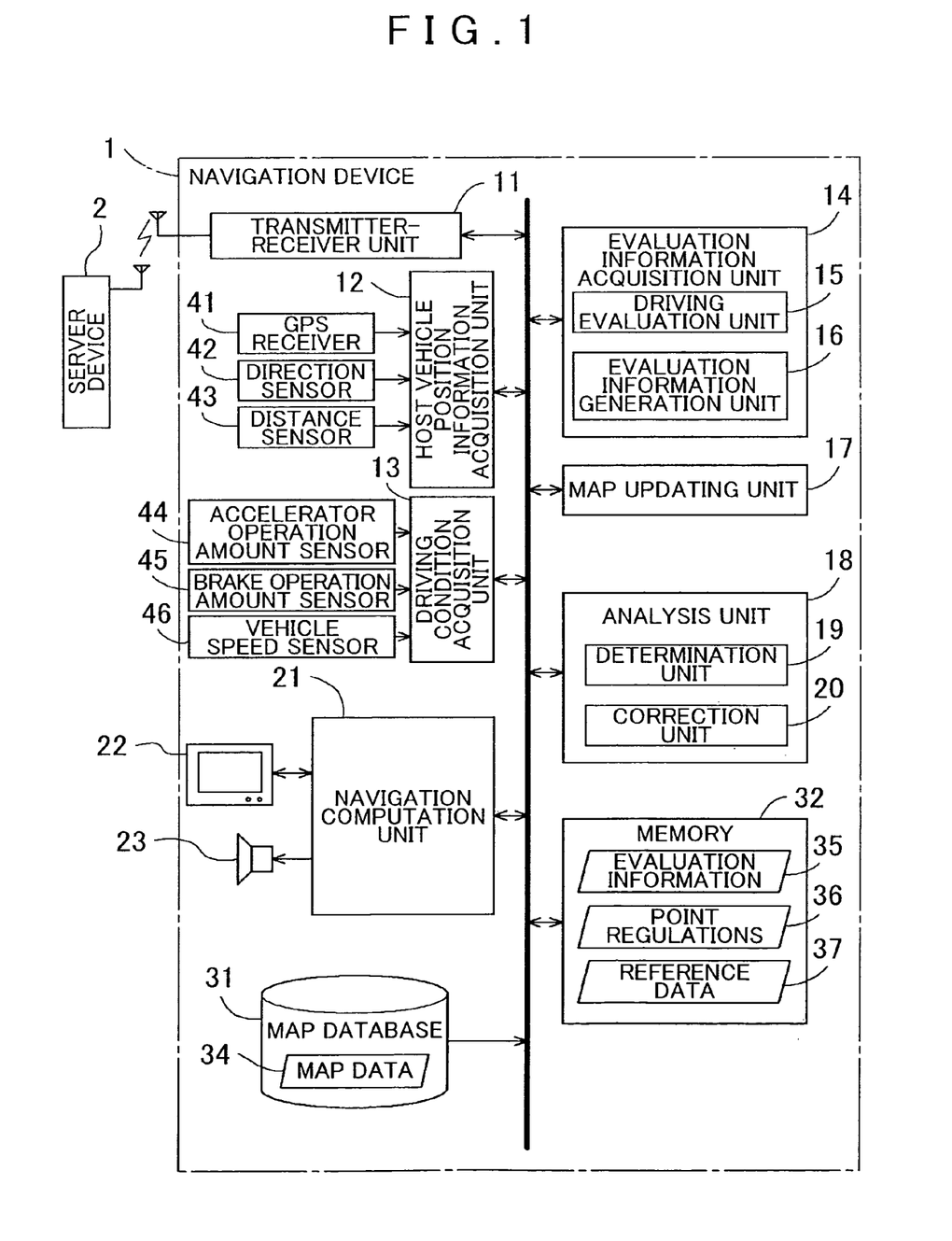
FIG. 1 is a block diagram that shows a schematic configuration of a navigation device according to an embodiment of the present invention.

Embodiments of the present invention will be described next with reference to the drawings. The description here regards an example in which the driving evaluation system according to the present invention includes a navigation device 1 that serves as an on-vehicle terminal, and a server device 2 that serves as a central control device that communicates with the navigation device 1. FIG. 1 is a block diagram that shows a schematic configuration of the navigation device 1. The navigation device 1 that forms the driving evaluation system evaluates a driving condition of a vehicle 3 based on map data 34 stored in a map database 31, and acquires and stores evaluation information 35 that includes an evaluation result based on the evaluation. The map data 34 are updated in accordance with update data 64 that are periodically acquired and include modifications that may have been made to the road characteristics of a road. Based on the road characteristic information included in the updated map data 34, the navigation device 1 analyzes the evaluation results for the evaluation information 35 acquired after the road characteristic has been modified but the map data 34 has been updated to incorporate the modified road characteristic. If the analysis indicates that invalid evaluations are present, the evaluation information 35 associated with the invalid evaluation is corrected. Thus, invalid evaluations resulting from inconsistencies between a road characteristic and the road characteristic information stored with the map data 34 in the map database 31 at a particular point may be suppressed.

Figure 2:
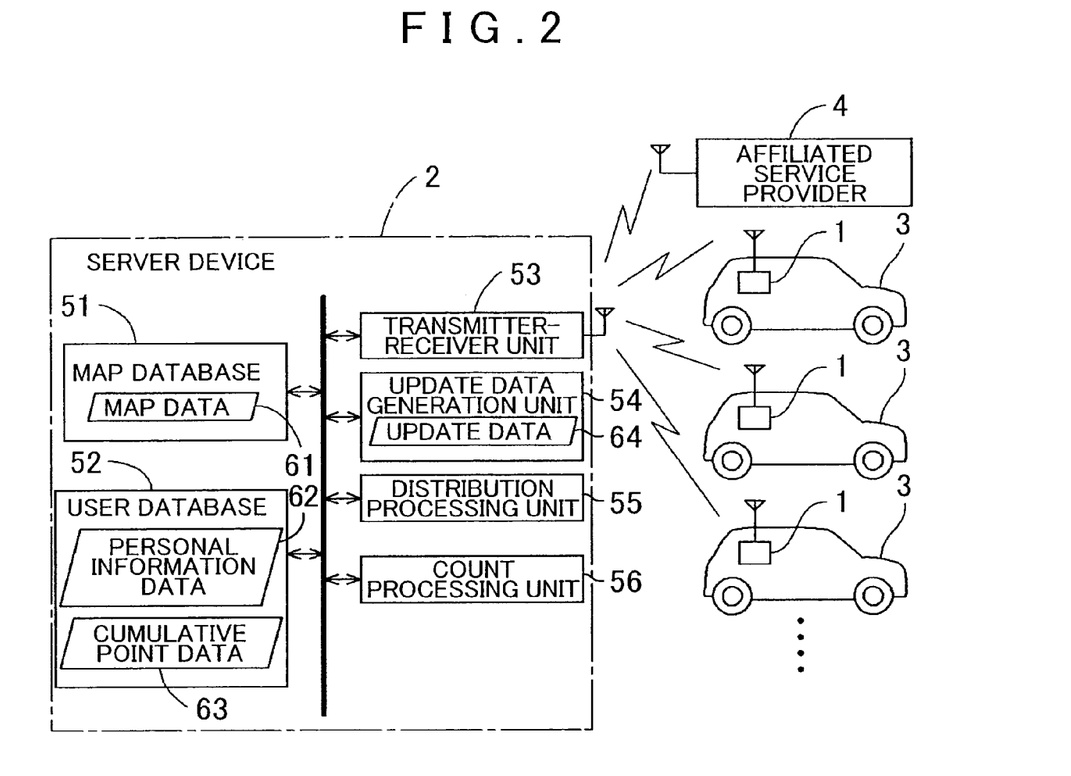
FIG. 2 is a block diagram that shows a schematic configuration of a server device according to the embodiment of the present invention.

FIG. 2 is a block diagram that shows a schematic configuration of the server device 2. The server device 2 distributes the update data 64 used to incorporate the modified road characteristics in the map data 34. The server device 2 also collects the evaluation information 35 from the navigation device 1, which is installed in the vehicle 3, and cumulative points. The cumulative point data is stored in the a user database 52.

1. Configuration of Navigation Device

The configuration of the navigation device 1 will be now be described. The components of the navigation device 1 shown in FIG. 1 each include a computation processing device such as a CPU or the like that is one of mutually shared and independently utilized computation processing devices. Each component for executing various processes on received data may be implemented as hardware, software (a program), or via a combination of both hardware and software. In the present embodiment, the navigation device 1 includes a transmitter-receiver 11, a host vehicle position information acquisition unit 12; a driving condition acquisition unit 13; an evaluation information accquisition unit 14; a map updating unit 17; an analysis unit 18; and a navigation computation unit 21. Each component is also configured to exchange information the other components via a communication line such as a digital transfer bus. If each component is implemented through software (a program), the software is stored in a storage unit such as RAM or ROM. The map database 31 has a hardware configuration that includes may be implemented in hardware as a storage medium (a storage unit) such as a hard disk drive or a flash memory. The memory 32 may also be implemented in hardware as a storage medium such as a hard disk drive or a flash memory. In addition, the memory 32 may be provided in a storage medium shared with the map database 31. The configuration of each component of the navigation device 1 according to the present embodiment will be explained in detail below.

1-1. Map Database

Figure 3:
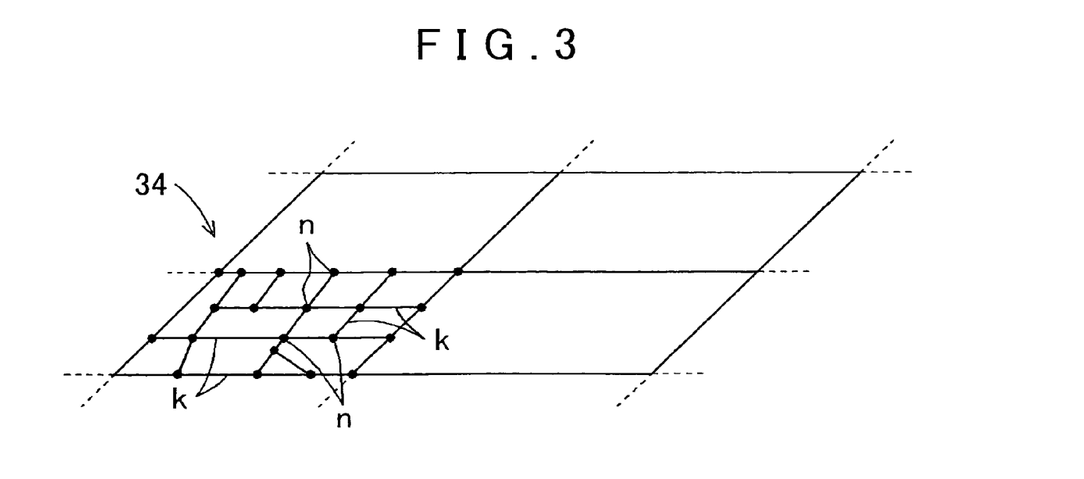
FIG. 3 is a drawing that shows an example of the structure of map data that are stored in a map database.
Figure 4A:
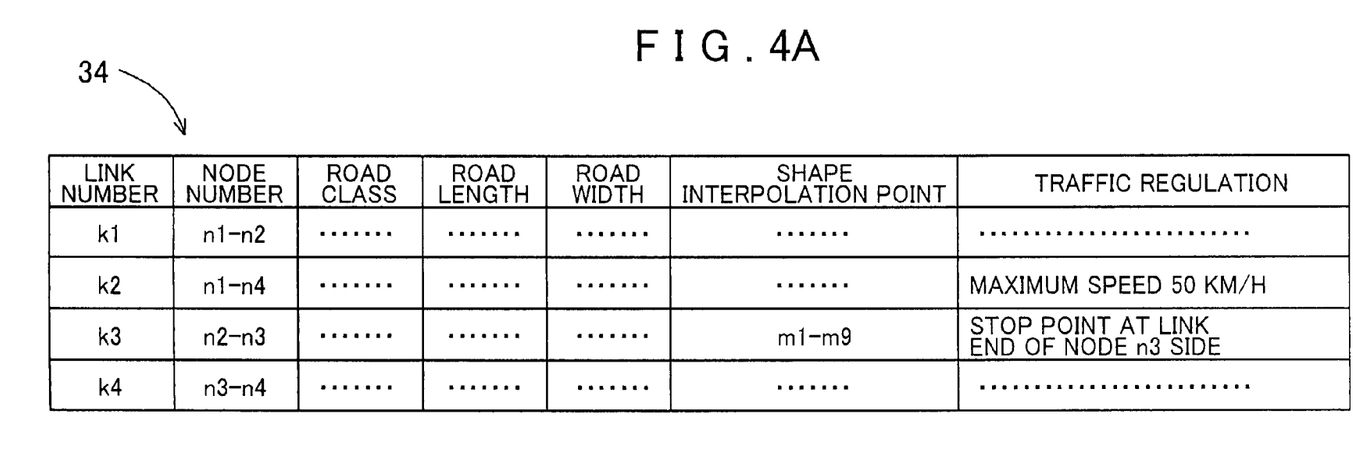
FIGS. 4A and 4B are drawings that show examples of link information pertaining to links that structure the map data.
Figure 4B:
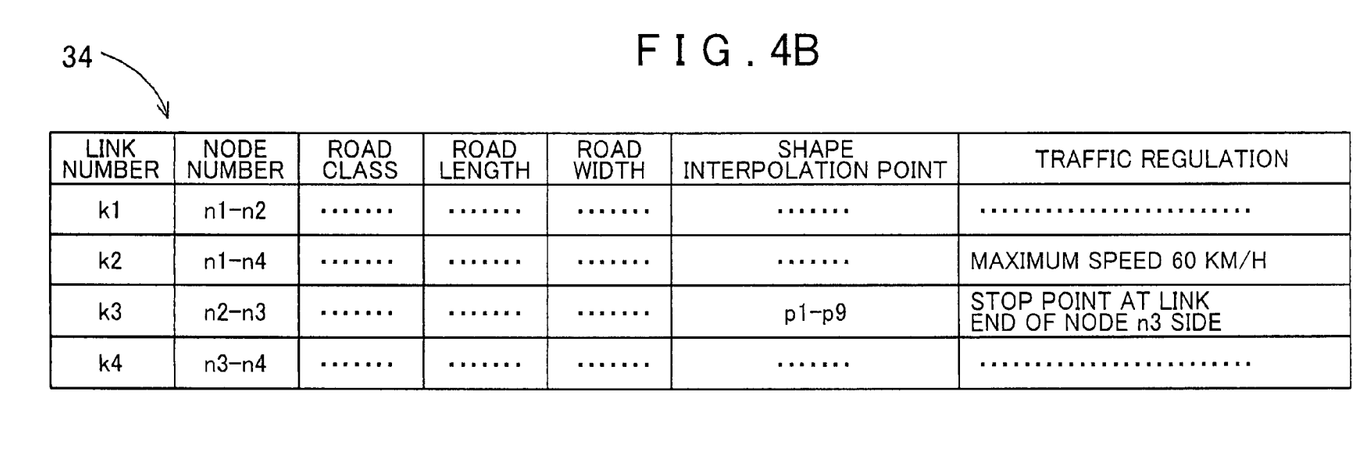

The map data 34 are stored in the map database 31. The map data 34 includes, as shown in FIG. 3, road network data constituted by a plurality of nodes n that represent to a plurality of intersections, and a plurality of links k connecting the nodes N that represent roads. Note that FIG. 3 shows only the road network data in one section and the road network data for other sections have been omitted. Each node n includes information relating to a position (coordinates) on a map expressed by longitude and latitude. The links k are connected via the nodes n, and as shown in FIGS. 4A and 4B, attribute information for each link k includes information pertaining to various road characteristics, such as a road class, a road length (a link length), a road width, shape interpolation points m (p), and traffic regulations applicable to the links k. The shape interpolation points m (p) are information for expressing link shapes, and road shapes such as curves are expressed by connecting the shape interpolation points m (p). Also, information that indicates traffic regulations, such as the speed limit, the location of a point where a stop is mandated, and such similar information are stored. Note that FIGS. 4A and 4B show specific examples only for information pertinent to an analysis process executed by the analysis unit 18, and information unrelated to the analysis process is omitted. Furthermore, FIG. 4A shows link information found in the map data 34 before being updated by the map updating unit 17, and FIG. 4B shows link information found in the map data 34 after an update. The map data 34 stored in the map database 31 also includes drawing information required to display the map image and various types of guidance information required for a route guidance process.

1-2. Transmitter-Receiver Unit

The transmitter-receiver unit 11 includes a communication device that sends data to the server device 2 and receives data from the server device 2 by wireless communication via a wireless base station or the like. A conventional communication network such as a cellular telephone network or a wireless LAN (Local Area Network), for example, may be used as a wireless communication system. In the present embodiment, the transmitter-receiver unit 11 receives the update data 64 for updating the map data 34 from the server device 2. In addition, the transmitter-receiver unit 11 receives update information for updating point regulations 36 stored in the memory 32. The transmitter-receiver unit 11 also sends to the server device 2 a score, which serves as the evaluation information 35, calculated and acquired based on the point regulations 36. It should be noted that if the score serving as the evaluation information 35 is corrected as a result of the analysis executed by the analysis unit 18, the corrected score is sent to the server device 2. This score will be explained in detail later.

1-3. Host vehicle Position Information Acquisition Unit

The host vehicle position information acquisition unit 12 acquires host vehicle position information that indicates the current position of the host vehicle. The host vehicle position information acquisition unit 12 is connected to a Global Positioning System (GPS) receiver 41, a direction sensor 42, and a distance sensor 43. The GPS receiver 41 receives a GPS signal from a GPS satellite. The GPS signal is normally received every second and output to the host vehicle position information acquisition unit 12. In the host vehicle position information acquisition unit 12, the signal received by the GPS receiver 41 from the GPS satellite may be analyzed, and additional information may be acquired, such as the current position (coordinates) of the vehicle, the direction in which the vehicle is heading, the vehicle speed, and the like. The direction sensor 42 detects at least one of the direction in which the host vehicle is heading and changes in the heading of the host vehicle. The direction sensor 42 may be a gyroscope, a geomagnetic sensor, or the like, for example. Also, the direction sensor 42 outputs the detected heading of the host vehicle to the host vehicle position information acquisition unit 12. The distance sensor 43 detects at least one of the speed of the host vehicle and the distance the host vehicle has traveled. The distance sensor 43 may be configured as a vehicle speed pulse sensor that outputs a pulse signal every time a drive shaft, a wheel, or the like of the vehicle rotates by a fixed amount, one of a yaw rate sensor and a G sensor that detects acceleration of the host vehicle, together with a circuit that integrates the detected acceleration, or the like, for example. Also, the distance sensor 43 outputs information regarding the detected vehicle speed and the detected distance traveled to the host vehicle position information acquisition unit 12.

Based on the outputs from the GPS receiver 41, the direction sensor 42, and the distance sensor 43, the host vehicle position information acquisition unit 12 determines the host vehicle position according using conventional methods. Furthermore, the host vehicle position information acquisition unit 12 executes a correction to match the host vehicle position with a road in the map data 34 by executing a map matching process based on the map data 34 stored in the map database 31. The corrected host vehicle position information used to update the host vehicle position information. Thus, the host vehicle position information acquisition unit 12 acquires the host vehicle position information that includes the current host vehicle position indicated by the coordinates (longitude and latitude) and information on the current vehicle heading.

1-4. Driving Condition Acquisition Unit

The driving condition acquisition unit 13 acquires a driving condition of the vehicle 3. In the present embodiment, the driving condition acquisition unit 13 is connected to an accelerator operation amount sensor 44, a brake operation amount sensor 45, and a vehicle speed sensor 46. Here, the accelerator operation amount sensor 44 detects an accelerator operation amount based on a depression amount of an accelerator pedal. The accelerator operation amount is acquired as 0% when the accelerator is not depressed and as 100% when the accelerator is fully depressed. The brake operation amount sensor 45 is detects a brake operation amount based on the brake hydraulic pressure. The vehicle speed sensor 46 detects the vehicle speed based on the rotational speed of the drive shaft that is connected with a wheel, for example. The detected accelerator operation amount, brake operation amount, and vehicle speed are output to the evaluation information acquisition unit 14 and used in processing for acquiring the evaluation information 35.

1-5. Evaluation Information Acquisition Unit

The evaluation information acquisition unit 14 evaluates a driving condition of the vehicle 3 that corresponds to road characteristic information included in the map data 34, and acquires the evaluation information 35 that includes an evaluation result based on the evaluation. In the present embodiment, as shown in FIG. 1, the evaluation information acquisition unit 14 is provided with a driving evaluation unit 15 and an evaluation information generation unit 16. The evaluation information acquisition unit 14 below generally includes the driving evaluation unit 15 and the evaluation information generation unit 16 unless otherwise noted.

1-5-1. Driving Evaluation Unit

The driving evaluation unit 15 performs an evaluation that corresponds to road characteristic information included in the map data 34, based on various types of driving conditions of the vehicle 3 that are acquired from the driving condition acquisition unit 13. In the present embodiment, the driving conditions acquired relate to the accelerator operation amount, the brake operation amount, and the vehicle speed that are acquired by the driving condition acquisition unit 13 as described above. Based on these driving conditions, the parameters of speed limit compliance, stop compliance, and deceleration before a curve are evaluated. In such case, the driving evaluation unit 15 first confirms the parameter and evaluation criterion at a point based on the host vehicle position information acquired by the host vehicle position information acquisition unit 12. With respect to speed limit compliance for example, information associated with the speed limit of the road on which the vehicle 3 is traveling is acquired from the map data 34. With respect to stop compliance and deceleration before a curve as well, for a point where a stop is mandated (which is referred to as a stop point below) or a curve ahead of the vehicle 3, the coordinates for the stop point or a curve entry point are acquired from the map data 34, and the reference vehicle speed or the reference brake operation amount for the stop point or the curve entry point is acquired. The information regarding the reference vehicle speed and the reference brake operation amount for the stop point or the curve entry point is stored in the memory 32 as reference data 37.

The driving evaluation unit 15 evaluates whether safe driving is being practiced based on the driving conditions acquired by the driving condition acquisition unit 13 and the reference data 37 for each parameter. The driving evaluation unit 15 evaluates speed limit compliance, for example, by comparing the current vehicle speed with the speed limit of the road on which the vehicle 3 is traveling. If the current vehicle speed is equal to or below the speed limit, result information 35c that indicates observance of the speed limit is generated. However, if the current vehicle speed exceeds the speed limit, result information 35c that indicates non-observance of the speed limit and the excessive speed amount is generated.

In another example regarding stop compliance, the driving evaluation unit 15 compares the current brake operation amount of the vehicle 3 with the brake operation amount indicated in the reference data 37 and also compares the current vehicle speed with the vehicle speed of 0 km/h at the stop point. If the brake operation amount when passing the stop point is equal to or greater than the reference brake operation amount and the vehicle speed is 0 km/h, result information 35c that indicates compliance with stopping is generated. However, if the brake operation amount is less than the reference brake operation amount or the vehicle speed is not 0 km/h, result information 35c that indicates non-compliance with stopping and the degree of non-compliance (the vehicle speed, brake operation amount, etc.) is generated.

As another example regarding deceleration before a curve, the driving evaluation unit 15 compares the current brake operation amount of the vehicle 3 with the brake operation amount included in the reference data 37 and compares the current vehicle speed with the vehicle speed included in the reference data 37. If the brake operation amount upon reaching the curve entry point is equal to or greater than the reference brake operation amount, and the vehicle speed is below the reference vehicle speed, result information 35c that indicates suitable deceleration before the curve is generated. However, if the brake operation amount is below the reference brake operation amount or the vehicle speed is equal to or greater than the reference vehicle speed, result information 35c that indicates insufficient deceleration before the curve and the degree of insufficient deceleration (the vehicle speed, brake operation amount, etc.) is generated.

The driving evaluation unit 15 also evaluates whether environmentally friendly driving is being practiced based on the driving conditions acquired by the driving condition acquisition unit 13 and the reference data 37 for each parameter. The driving evaluation unit 15 evaluates fuel efficiency, for example, by comparing the relationship between the current vehicle and accelerator operation amount, and the relationship between the vehicle speed and accelerator operation amount, which minimizes fuel consumption. If the relationship between the current vehicle speed and accelerator operation amount satisfies the relationship between the vehicle speed and accelerator operation amount which can minimize fuel consumption, result information 35c that indicates the achievement of fuel efficient travel is generated. However, if the relationship between the current vehicle speed and accelerator operation amount of the vehicle 3 does not satisfy the relationship between the vehicle speed and accelerator operation amount which can minimize fuel consumption, result information 35c that indicates the non-achievement of fuel efficient travel and the degree of non-achievement is generated. It should be noted that the result information 35c may also be generated based on the on/off state of an "eco-lamp" that turns on when fuel efficient travel is achieved and remains off when fuel efficient travel is not achieved.

The result information 35c generated by the driving evaluation unit 15 pertaining to safe driving and environmentally friendly driving is output to the evaluation information generation unit 16.

1-5-2. Evaluation Information Generation Unit

Figure 7:
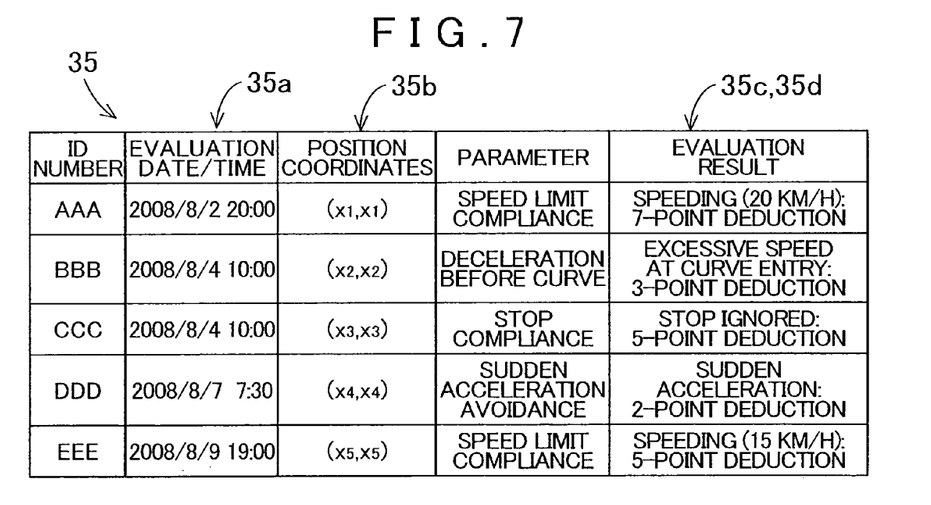
FIG. 7 is a drawing that shows an example of evaluation information that is stored in memory.

The evaluation information generation unit 16 generates the evaluation information 35 based on the result information 35c from the driving evaluation unit 15. The evaluation information 35 includes at least the result information 35c. In the present embodiment, evaluation timestamp 35a, position information 35b, and parameters are further stored along with the result information 35c and indexed with the result information 35c. Here, the evaluation timestamp 35a pertains to the date and time when the result information 35c is acquired. The position information 35b includes the coordinates of the point at which the result information 35c, i.e., the evaluation result, is acquired. In the present embodiment, point information 35d is further included and pertains to points assigned for safe driving and environmentally friendly driving. Based on the result information 35c, points are calculated in accordance with the point regulations 36 stored in the memory 32. The point regulations 36 specify a relationship between the result information 35c and the number of points assigned. As an example of a point regulation 36, in the present embodiment, a specified point is assigned (e.g. 100 points) per trip (i.e., travel once a main power source of the vehicle 3 is turned on until it is turned off). If the driver drives in a manner that is not safe or environmentally friendly, the point regulations 36 specify point deductions based on the result information 35c that corresponds to the driving (e.g. in the case of speed limit non-compliance, 1 to 10 points are deducted depending on the amount of excess speed). The evaluation information 35 is stored in the memory 32. FIG. 7 shows an example of the evaluation information 35 that is stored in the memory 32. In the present embodiment, the memory 32 corresponds to an "evaluation information storage unit" according to the present invention. The result information 35c included in the evaluation information 35 is output to the analysis unit 18 and used in the analysis. The point information 35d included in the evaluation information 35 is sent to the server device 2 via the transmitter-receiver unit 11.

1-6. Map Updating Unit

The map updating unit 17 updates the map data 34 upon acquisition of the update data 64. In the present embodiment, the map updating unit 17 automatically executes an update process for the map data 34 after receiving the update data 64 from the server device 2. Furthermore, in the present embodiment, the update data 64 is generated as difference data that indicate as a difference the modified road characteristic (described in more detail later). Thus, the corresponding update process performed by the map updating unit 17 is also a difference update process. More specifically, the map updating unit 17 executes a difference update process for the map database 31 by applying to the map data 34 stored in the map database 31 the contents of additions, modifications, and deletions to map data 61 stored in a map database 51 (see FIG. 2), which are included in the update data 64.

1-7. Analysis Unit

After the map data 34 is updated, based on the road characteristic information included in the updated map data 34, the analysis unit 18 analyzes the evaluation result included in the evaluation information 35 that is acquired during the period between the time when the road characteristic is modified and the time when the map data 34 is updated to incorporate the modified road characteristic in the map data. In the present embodiment, as shown in FIG. 1, the analysis unit 18 includes a determination unit 19 and a correction unit 20. The analysis unit 18 below is generally intended to include the determination unit 19 and the correction unit 20 unless otherwise noted.

1-7-1. Determination Unit

The determination unit 19 compares the pre-update map data 34 and the post-update map data 34 to derive the modified content of the road characteristic information, and determines whether the modification of the road characteristic invalidates the evaluation result. In the present embodiment, the update data 64 is distributed as difference data and therefore the determination unit 19 can derive the changed road characteristic information by referring to the content of the update data 64. Accordingly, the determination unit 19 determines whether the modification of the road characteristic information invalidates the evaluation result based on the evaluation information 35 and the update data 64 stored in the memory 32 in accordance with criteria set depending on the parameter.

Here, based on the position information 35b included in the evaluation information 35, the determination unit 19 extracts the evaluation information 35 for a point that falls within a region where the map data 34 is updated. The determination unit 19 then determines whether the modification of the road characteristic information invalidates the evaluation result for the extracted evaluation information 35. According to the present embodiment, as described later in more detail, the update data 64 is distributed as difference data for each road (link k). Therefore, the determination unit 19 extracts the evaluation information 35 that is acquired in the past for a road (a link k) which is indicated in the update data 64 and for which the update process of the map data 34 is executed, and determines for this evaluation information 35 whether the modification of the road characteristic information invalidates the evaluation result. By thus determining whether the modification of the road characteristic information invalidates the evaluation result for only the evaluation information 35 regarding a point included within a region where the map data 34 is updated, the evaluation information 35 to be analyzed may be appropriately selected and the processor load reduced.

The determination unit 19 also extracts the evaluation information 35 that is acquired during a predetermined period before the time when the map data 34 is updated. The determination unit 19 then determines whether the changed road characteristic information invalidates the evaluation result for the extracted evaluation information 35. In the present embodiment, the determination unit 19 extracts the evaluation information 35 acquired during the period between the time when the road characteristic is modified and the time when the map data 34 is updated, and then determines whether the changed road characteristic information invalidates the evaluation result for the extracted evaluation information 35. Here in the present embodiment, the update data 64 includes modification timestamp 64a (described later), which pertains to the date and time when the road characteristic is modified. Therefore, by referring to the modification timestamp 64a, the time when the road characteristic is modified may be determined. Based on the evaluation information 35a, the determination unit 19 extracts the evaluation information 35 acquired after the time the road characteristic is modified, and determines whether the changed road characteristic information invalidates the evaluation result for the extracted evaluation information 35. By thus determining whether the changed road characteristic information invalidates the evaluation result for only the evaluation information 35 that is acquired after the time the road characteristic is modified, the minimum necessary evaluation information 35 for analyzing whether an invalid evaluation has occurred may be extracted and the processor load reduced.

Figure 5:
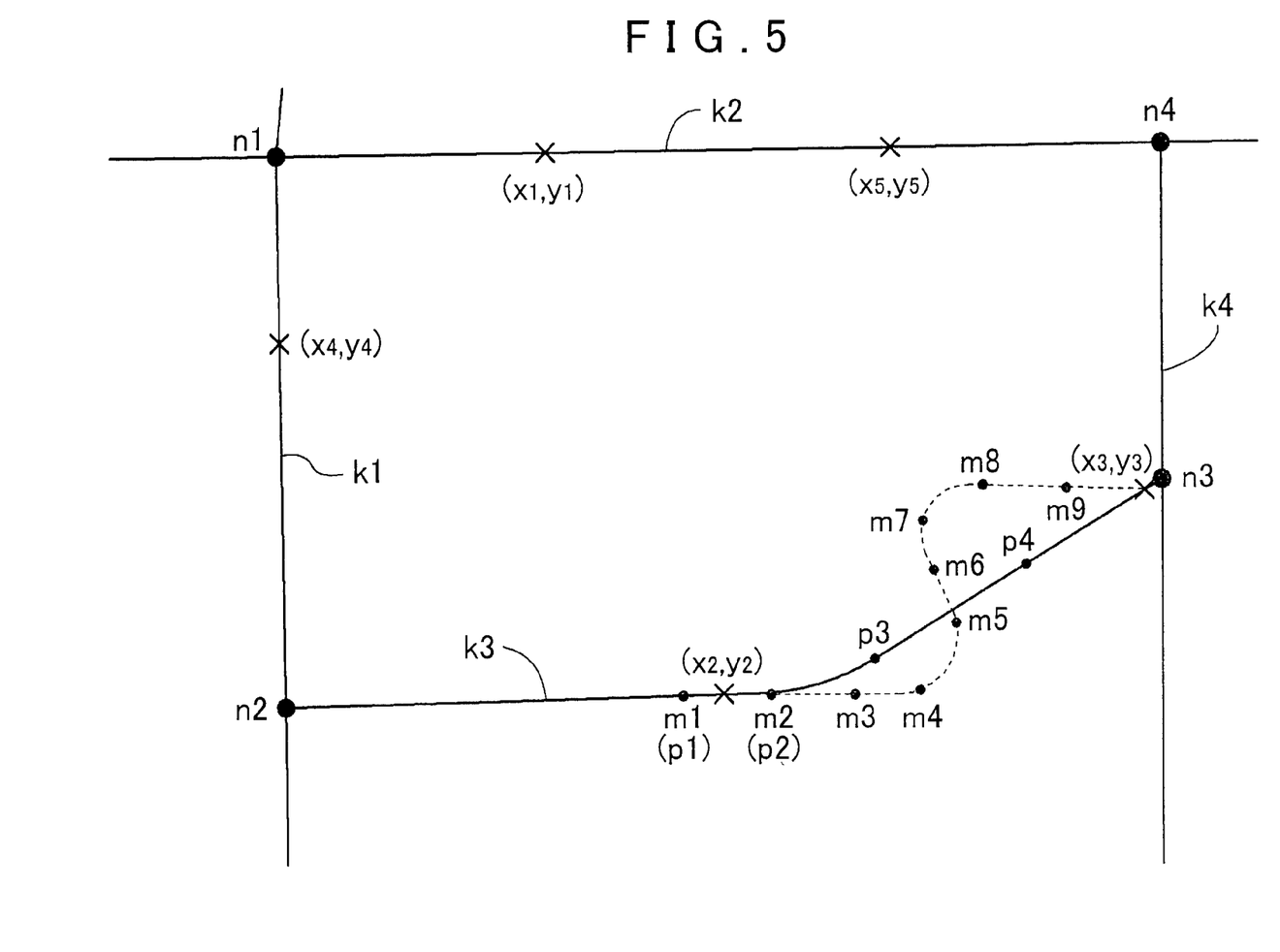
FIG. 5 is a drawing for explaining the content of an analysis process that accompanies a modification of a road characteristic.

Next, based on FIG. 5, a determination process executed by the determination unit 19 to determine whether the modification of a road characteristic information will invalidate an evaluation result is explained with a specific example. Specifically, road work to eliminate an S-curve and build a new curve with a relatively small curvature on a road that corresponds to a link k3 was completed at midnight on Jul. 31, 2008. Furthermore, the maximum speed limit for the road corresponding to a link k2 was increased from 50 km/h to 60 km/h. For the link k3 in FIG. 5, the eliminated S-curve is shown by a dashed line and the newly built curve is shown by a solid line. The road shape (the link shape) of the eliminated S-curve is expressed by shape interpolation points m1 to m9, and the road shape (the link shape) of the newly built curve is expressed by shape interpolation points p1 to p4. Further note that while the link shape of the link k3 was modified, a stop regulation at the link end of a node n3 side was not.

Within the area shown in FIG. 5, an excessive speed 20 km/h over the limit was found at the point expressed by the coordinates $(x_1, y_1)$ at 20:00, Aug. 2, 2008. The evaluation information acquisition unit 14 thus acquired an evaluation result of a 7-point deduction, which is associated with the ID number "AAA" and stored (see FIG. 7). At 10:00, Aug. 4, 2008, an excessive curve entry speed was found at the point expressed by the coordinates $(x_2, y_2)$. The evaluation information acquisition unit 14 thus acquired an evaluation result of a 3-point deduction, which is associated with the ID number "BBB" and stored. Next, non-compliance with a mandatory stop was found at the point expressed by the coordinates $(x_3, y_3)$. The evaluation information acquisition unit 14 thus acquired an evaluation result of a 5-point deduction, which is indexed with the ID number "CCC" and stored. At 7:30, Aug. 7, 2008, it was determined that sudden acceleration occurred at the point indicated by the coordinates $(x_4, y_4)$. The evaluation information acquisition unit 14 thus acquired an evaluation result of a 2-point deduction, which is indexed with the ID number "DDD" and stored. At 19:00, Aug. 9, 2008, an excessive speed 15 km/h over the limit was found at the point indicated by the coordinates $(x_5, y_5)$. The evaluation information acquisition unit 14 thus acquired an evaluation result of a 5-point deduction, which is indexed with the ID number "EEE" and stored. Lastly, at 00:00, Aug. 10, 2008, the update data 64 is generated and distributed to incorporate the modifications of the road characteristics information in the map data 34.

When the navigation device 1 receives the update data 64 and the map updating unit 17 executes the update process for the map data 34 accordingly, the determination unit 19 extracts the evaluation information 35 for points included in the region where the map data 34 is updated. In this example, the difference update process is executed for the links k2 and k3. Therefore, the determination unit 19 extracts the evaluation information 35 for the points expressed by the coordinates $(x_1, y_1)$, $(x_2, y_2)$, $(x_3, y_3)$, and $(x_5, y_5)$, which are all points on the links k2 and k3. The link k1 is not applicable to the difference update process, and therefore the evaluation information 35 for the point expressed by the coordinates $(x_4, y_4)$ is not extracted.

Next, the determination unit 19 extracts the evaluation information 35 that is acquired during the period between the time when the road characteristic is modified to the time when the map data 34 is updated. As explained earlier, the time when the road characteristic is modified is calculated from the modification timestamp 64a included in the update data 64. With respect to the link k2 first in this example, the road characteristic is modified at midnight on Aug. 3, 2008, and therefore the determination unit 19 extracts the evaluation information 35 that was acquired after midnight on Aug. 3, 2008 and is identified by the ID number "EEE". The evaluation information 35 identified by the ID number "AAA" is not extracted because it was acquired before the link k2 was modified. With respect to the link k3, the road characteristic was modified at midnight on Jul. 31, 2008, and therefore the determination unit 19 extracts the evaluation information 35 that was acquired after midnight on Jul. 31, 2008 and is identified by the ID number "BBB" and "CCC".

The determination unit 19 determines whether changed road characteristic information invalidates the evaluation result for the extracted evaluation information 35 in accordance with the criteria set for each the parameter. For example, with respect to the evaluation information 35 identified by the ID number "EEE" and pertaining to the link k2, the speeding was evaluated. The traffic regulation (here, the speed limit) employed as the road characteristic was modified by the update process of the map data 34. In this case, because the speed serving as a reference for determining whether speeding occurred has changed, the determination unit 19 determines that the modification of the road characteristic information invalidates the evaluation result for the evaluation information 35 identified by the ID number "EEE". Regarding the evaluation information 35 identified by the ID numbers "BBB" and "CCC" and pertaining to the link k3, the curve entry speed (deceleration before a curve) and stop compliance are respectively evaluated. Of the road characteristics information used, only the road shape was modified while the traffic regulation (here, the mandatory stop) was not modified by the update process of the map data 34. In this case, regarding the curve entry speed (deceleration before a curve), the speed serving as a reference for determining whether sufficient deceleration has been achieved before the curve differs depending on the road shape (curvature of the curve, etc.). Therefore, the determination unit 19 determines that the modification of the road characteristic information invalidates the evaluation result for the evaluation information 35 identified by the ID number "BBB". Meanwhile, regarding stop compliance, the position of the stop point does not change regardless of the modification to the road shape and the vehicle must still stop at the stop point. Therefore, the determination unit 19 determines that the modification of the road characteristic information does not invalidate the evaluation result for the evaluation information 35 identified by the ID number "CCC".

1-7-2. Correction Unit

If it is determined that the changed road characteristic information invalidates the evaluation result, the correction unit 20 corrects the affected evaluation information 35 that includes the evaluation result. In the present embodiment, if the determination unit 19 determines that the changed road characteristic information invalidates the evaluation result, the correction unit 20 selectively deletes the evaluation information 35 that includes the evaluation result. A determination by the determination unit 19 that the modification of the road characteristic information invalidates the evaluation result means there is a high probability that the evaluation result is invalid. Hence, a configuration that selectively deletes the evaluation information 35 that includes the evaluation result from the memory 32 enables deletion of the invalid evaluation through a relatively simple process. In the specific example above, the evaluation information 35 identified by the ID numbers "BBB" and "EEE" are selectively deleted from the memory 32.

1-8. Navigation Computation Unit

The navigation computation unit 21 operates in accordance with application programs for executing navigation functions, such as displaying the host vehicle position, calculating the route from a departure point to a destination, providing route guidance to a destination, and searching for a destination. For example, the navigation computation unit 21 acquires the map data 34 around the host vehicle from the map database 31 to display a map image on a display input device 22, and displays a host vehicle position mark that is superimposed over the map image based on the host vehicle position information. The navigation computation unit 21 also provides course guidance using either or both the display input device 22 and an audio output device 23 based on the host vehicle position information and the route from the departure point to the destination, which may be calculated using conventional methods. Note that in addition to the above, the navigation computation unit 21 is connected with various components required for the navigation device 1, including a remote controller and a user interface such as a touch panel or the like that is integrally provided with the display input device 22.

2. Configuration of Server Device

The configuration of the server device 2 will be described next. As FIG 2 shows, the server device 2 communicates with the navigation device 1 that is installed in the vehicle 3. When a road characteristic is modified, the server device 2 generates the update data 64 to incorporate the modified road characteristic in the map data 34, and distributes the update data 64 to the navigation device 1 installed in the vehicle 3. Also, the server device 2 collects and counts the point information 35d used as the evaluation information 35 from the navigation device 1, and stores these in the user database 52.

Each component of the server device 2 shown in FIG. 2 includes a computation processing device such as a CPU or the like that is one of mutually shared and independently utilized computation processing devices. Each component executing various processes on received data may be implemented by hardware, software (a program), or both hardware and software. In the present embodiment, the server device 2 includes a transmitter-receiver unit 53, an update data generation unit 54, a distribution process unit 55, and a count process unit 56. Each component is also configured such that information may be exchanged with another functional portion via communication lines such as a digital transfer bus. If each functional portion is implemented by software (a program), the software is stored in a storage unit such as a RAM and a ROM. The map database 51 and the user database 52 also have hardware configurations that include a storage medium (a storage unit), such as a hard disk drive or a flash memory. The configurations of each portion of the server device 2 according to the present embodiment will be described in detail below.

2-1. Map Database

Map data 61 is stored in the map database 51. Furthermore, the map data 61 includes road network data constituted by a plurality of nodes n corresponding respectively to a plurality of intersections, and a plurality of links k corresponding to roads that connect the nodes n, basically similar to the map data 34 that is stored in the map database 31 provided in the navigation device 1. Each node n includes information relating to a position (coordinates) on a map expressed by longitude and latitude. The links k are connected via the nodes n, and attribute information for each link k includes information pertaining to various types of road characteristics, such as a road class, a road length (a link length), a road width, shape interpolation points m (p), and traffic regulations applicable to the links k. The content of the map database 51 serves as a reference for generating the update data 64 described later.

2-2. User Database

The user database 52 is a database in which corresponding personal information data 62 and cumulative point data 63 are stored for each vehicle 3. The personal information data 62 includes information for identifying the driver of the vehicle 3, information that indicates the model and specifications of the vehicle 3, as well as information that indicates a driving history, skill level, driving habits and the like of the driver. In the present embodiment, although not described in detail, the number of points acquired by the driver may be used to select an appropriate predetermined service from an affiliated service provider 4. Accordingly, information pertaining to the driver's preferences, for example, are also included as basic information in order to distribute advertising information from the affiliated service provider 4. The cumulative point data 63 indicates a cumulative score that is the total number of points assigned when the driver performs safe driving or environmentally friendly driving per trip.

2-3. Transmitter-Receiver Unit

The transmitter-receiver unit 53 includes a communication device that sends data to the navigation device 1 and receives data from the navigation device 1 by wireless communication via a wireless base station or the like. The wireless communication method may be the same as that used in the transmitter-receiver unit 11 of the navigation device 1. In the present embodiment, the transmitter-receiver unit 53 sends the update data 64 to the navigation device 1. The transmitter-receiver unit 53 also sends update information for updating the point regulations 36 stored in the memory 32. In addition, the transmitter-receiver unit 53 receives the point information 35d that serve as the evaluation information 35 from the navigation device 1.

2-4. Update Data Generation Unit

Figure 6:
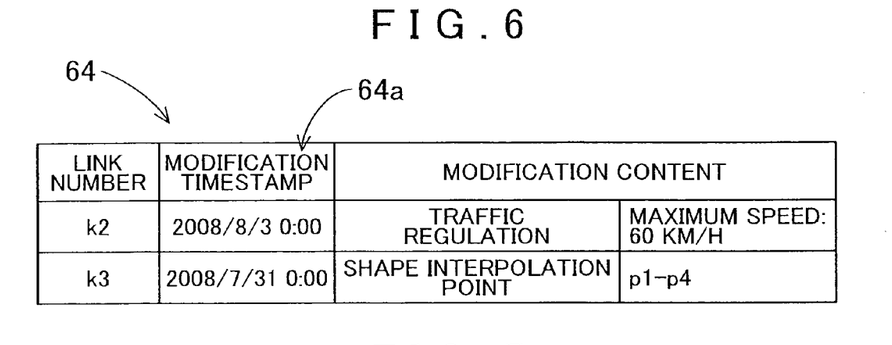
FIG. 6 is a drawing that shows an example of information included in update data.

The update data generation unit 54 generates the update data 64 to change the road characteristic information included in the map data 34. The update data 64 is the accumulated data for updating the map database 31, and is consolidated in one place. In the present embodiment, using the content of the map database 51 stored in the server device 2 as a reference, the update data 64 is generated as difference data that indicates modified road characteristics for various roads (units of links k). An example of this update data 64 is shown in FIG. 6. Here, FIG. 6 shows the difference data that corresponds to the modifications of the road characteristics that were used in an earlier example to explain the analysis process. Specifically, regarding the link k2, the maximum speed limit is increased from 50 km/h to 60 km/h. Therefore, the modification content includes information regarding the maximum speed limit of 60 km/h after the modification. Regarding the link k3, the road shape expressed by the shape interpolation points m1 to m9 was modified to the road shape expressed by the shape interpolation points p1 to p4. Therefore, the modification content includes information regarding the shape interpolation points p1 to p4 after the modification. Although these road characteristics were modified on different days, the modifications occurred relatively close in time, and therefore both modified road characteristics are consolidated in the update data 64.

In the present embodiment, the update data 64 further includes modification timestamp 64a. The modification timestamp 64a is indexed and stored with the modification content of the modified road characteristic. Here, the modification timestamp 64a pertains to the date and time when the road characteristic is modified. The modification timestamp 64a included in the update data 64 is used in the analysis process executed by the analysis unit 18.

2-5. Distribution Processing Unit

The distribution processing unit 55 distributes the update data 64 generated by the update data generation unit 54 to the navigation device 1 via the transmitter-receiver unit 53. When update information for updating the point regulations 36 or the reference data 37 is generated, the distribution processing unit 55 distributes the update information to the navigation device 1 via the transmitter-receiver unit 53.

2-6. Count Processing Unit

The count processing unit 56 executes a counting process for the cumulative points of the vehicle 3. The count processing unit 56 carries out the counting process for the cumulative points of the vehicle 3 based on the cumulative point data 63 of the vehicle 3 stored in the user database 52, information pertaining to either the point information 35d received from the vehicle 3 (the navigation device 1) or points that are used as a value in order to receive a predetermined service from the affiliated service provider 4. For example, if the driver acquires points serving as the evaluation information 35 and the server device 2 receives information pertaining to these points, the count processing unit 56 reads out the cumulative point data 63 from the user database 52, and updates the cumulative point data 63 by adding the newly acquired points. Meanwhile, if the driver received the predetermined service from the affiliated service provider 4, the count processing unit 56 reads out the cumulative point data 63 from the user database 52, and updates the cumulative point data 63 by subtracting the points used as a value for the affiliated service provider 4. In this manner, the count processing unit 56 calculates the cumulative point data 63 of the vehicle 3 after points are acquired or after points are used.

3. Procedure for Operation Process

Figure 8:
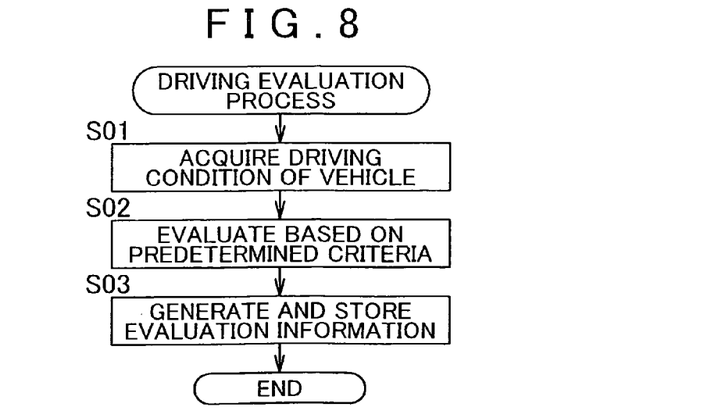
FIG. 8 is a flowchart that shows a procedure for a driving evaluation process.
Figure 9:
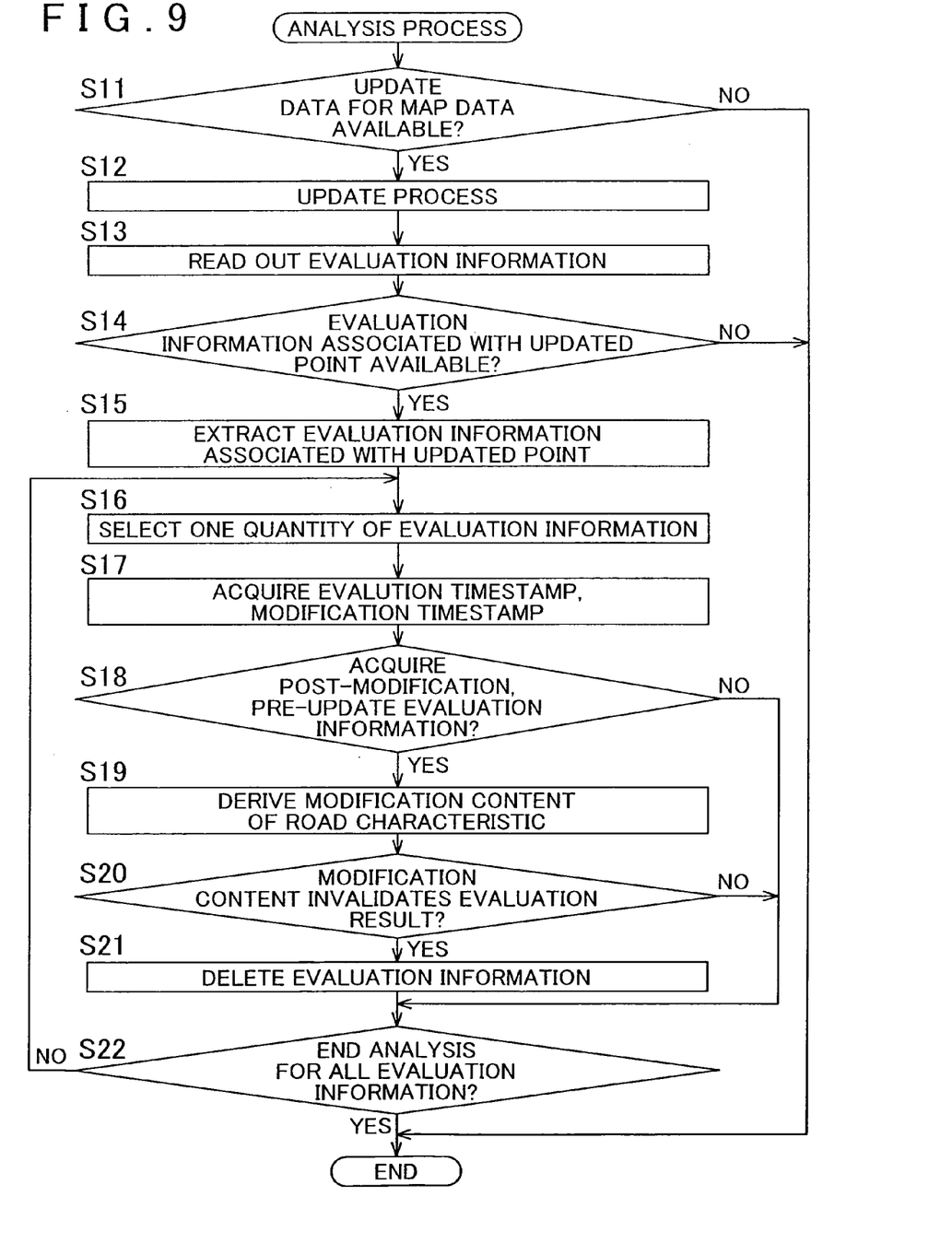
FIG. 9 is a flowchart that shows a procedure for the analysis process.

Next, procedures for a driving evaluation process and the analysis process (a driving evaluation method and an analysis method) that are executed in the navigation device 1 according to the present embodiment will be explained. FIG. 8 is a flowchart that shows the procedure for the driving evaluation process, and FIG. 9 is a flowchart that shows the procedure for the analysis process. The descriptions below follow the order of the flowcharts.

3-1. Driving Evaluation Process

The procedure for the driving evaluation process will be explained first. As FIG. 8 shows, the driving condition acquisition unit 13 acquires the driving conditions of the vehicle 3, such as the accelerator operation amount, the brake operation amount, and the vehicle speed (S1). Next, the driving evaluation unit 15 evaluates the corresponding road characteristic, based on the driving conditions of the vehicle 3 that acquired at S1 and predetermined evaluation criteria. The evaluation information generation unit 16 then generates the evaluation information 35 based on the evaluation result at S02, and stores the evaluation information 35 in the memory 32 (S3). With this, the driving evaluation process ends.

3-2. Procedure for Analysis Process

The procedure for the analysis process will be described next. As FIG. 9 shows, if the update data 64 for the map data 34 is received by the transmitter-receiver unit 11 (YES at S11), the update process for the map data 34 is executed by the map updating unit 17 (S12). The determination unit 19 then reads out the evaluation information 35 that is stored in the memory 32 (S13), and determines whether there is evaluation information 35 associated with the point that is updated by the update process at S12 (S14). If it is determined that there is no evaluation information 35 associated with the updated point (NO at S14), the analysis process ends. However, if it is determined that there is evaluation information 35 associated with the updated point (YES at S14), the determination unit 19 extracts the evaluation information 35 associated with the updated point (S15).

Next, the determination unit 19 selects one quantity of evaluation information 35 from among the evaluation information 35 extracted at S15 (S16). The determination unit 19 then acquires the evaluation timestamp 35a included in the evaluation information 35 and the modification timestamp 64a included in the update data 64 (S17). Based on the evaluation timestamp 35a and the modification timestamp 64a, the determination unit 19 determines whether the evaluation information 35 is acquired during the period between the time when the road characteristic is modified and the time when the map data 34 is updated (the transitional period) (S18). If it is determined that the evaluation information 35 is acquired during the period between the time when the road characteristic is modified and the time when the map data 34 is updated (YES at S18), the determination unit 19 refers to the update data 64 to derive the modification content of the road characteristic information (S19), and determines whether the changed road characteristic information invalidates the evaluation result (S20). If it is determined that the modification content of the road characteristic information invalidates the evaluation result (YES at S20), the correction unit 20 selectively deletes the evaluation information 35 that includes this evaluation result from the memory 32 (S21). However, if it is determined that the evaluation information 35 is not acquired during the period between the time when the road characteristic is modified and the time when the map data 34 is (NO at S18), and it is determined that the modification content of the road characteristic does not invalidate the evaluation result (NO at S20), the process proceeds to S22. The determination unit 19 then determines whether all the evaluation information extracted at S15 has been analyzed (S22). If it is determined that all the evaluation information 35 has not been analyzed (NO at S22), the process is repeated from S16 to S22. However, if it is determined that all the evaluation information 35 has been analyzed (YES at S22), the analysis process ends. Note that in the present embodiment, repeating the process from S16 to S22 means simultaneously executing the process to extract the evaluation information 35 that is acquired during the period between the time when the road characteristic is modified and the time when the map data 34 is updated, and the process of analyzing the evaluation results of the extracted evaluation information 35.

According to an aspect of the present invention, the evaluation information may include the position coordinate of the point for which the evaluation information is acquired. In addition, based on the position coordinate, the analysis unit may extract the evaluation information for the point included in the region where the map data is updated, and analyze the evaluation result for the extracted evaluation information.

According to this configuration, when the map data is partially updated, only the evaluation result pertaining to the evaluation information for the point that is included in the updated region is analyzed. Therefore, the evaluation information to be analyzed may be appropriately selected and the processor load reduced.

The evaluation information may further include the evaluation timestamp when the evaluation information is acquired. In addition, based on the evaluation timestamp, the analysis unit may extract evaluation information acquired within a predetermined period before the map data is updated, and analyze the evaluation result for the extracted evaluation information.

According to this configuration, from a timing standpoint, only evaluation results that include evaluation information that may be invalidated due to the time lag in updating the map data are analyzed. Therefore, the evaluation information to be analyzed is appropriately selected and the processor load reduced.

Based on the evaluation timestamp the analysis unit may extract the evaluation information acquired during a predetermined period before the time the map data is updated, and analyze the evaluation result for the extracted evaluation information. In this case, the update data may include modification timestamp when the road characteristic is modified. In addition, based on the modification timestamp and the evaluation timestamp, the analysis unit may extract the evaluation information acquired during the period between the time when the road characteristic is modified and the time when the map data is updated, and analyze the evaluation result for the extracted evaluation information.

According to this configuration, based on the modification timestamp, the period between the time when the road characteristic is modified and the time when the map data is updated may be set as the predetermined period. Therefore, in addition to analyzing for invalid evaluations, the necessary evaluation information may be extracted in a sufficient amount.

Alternatively, based on the evaluation timestamp, the analysis unit may extract the evaluation information acquired between a specified amount of time before the update data can be acquired, the update data is acquired or when the map data is updated, and when the map data is updated, and analyze the evaluation result for the extracted evaluation information.

According to this configuration, if there is a preset period between the time the road characteristic is modified and the time when the update data is generated, the update data 64 is received by a user, or the map data is updated by the user, the evaluation information that is generated during any of these periods is extracted. Therefore, in addition to analyzing for invalid evaluations, the minimum necessary evaluation information may be extracted.

Furthermore, the road characteristic may be at least one of a road shape, a road class, and a traffic regulation for the road.

If the road shape (e.g. the curvature of the curve) or a traffic regulation for the road (e.g. speed limit and stop regulations) is modified, it is assumed that the driving conditions of the vehicle also change accordingly. Therefore, invalid evaluations caused by a time lag in updating the map data are more prone to occur as. Thus, the present invention may also be applied when the road characteristic is either the road shape or a traffic regulation for the road as in the above configuration.

In addition, the analysis unit may include: a determination unit that compares map data before an update with map data after an update to derive the changed road characteristic information, and determines whether the changed road characteristic information invalidates the evaluation result; and a correction unit that corrects the evaluation information including the invalidated evaluation result when the determination unit determines that the modification of the road characteristic information invalidates the evaluation result.

When the map data is updated after the modification of a road characteristic information, the evaluation result may not be affected and may remain unchanged by the update to the map data. Hence, in the present configuration, the correction unit only corrects the evaluation information if it is determined in conjunction with the update to the map data that the evaluation result will be invalidated by the changed road characteristic information. Therefore, the evaluation information to be corrected may be appropriately selected.

The evaluation information acquisition unit may evaluate the driving conditions of the vehicle for at least one of a parameter pertaining to safety and a parameter pertaining to an environmental impact. Furthermore, the determination unit may determine whether the changed road characteristic information invalidates the evaluation result in accordance with criteria set depending on the parameter.

According to this configuration, designating at least one of the parameters of speed limit compliance, stop compliance, and deceleration before a curve, which are items essential to the safe operation of a vehicle, for evaluation enables a suitable evaluation of the safe driving condition of the vehicle. In addition, the determination unit may determine whether the changed road characteristic information invalidates the evaluation result in accordance with an appropriate criterion that corresponds to the parameter.

The correction unit may selectively corrects the evaluation information that includes the invalidated evaluation result by deleting the evaluation information including the invalidated evaluation result form the evaluation information storage unit.

According to this configuration, by selectively deleting the evaluation result that is determined to be invalidated by the modification of the road characteristic information based on the analysis, the invalidated evaluation may be deleted after the fact through a relatively simple process.

Other Embodiments (1) It is explained in the above embodiment that the update data 64 indicates the modification of the road characteristic for each road (link k), and the map updating unit 17 executes the update process as a difference update process in accordance with this difference data. However, the embodiments of the present invention are not limited to this example. Namely, the update data 64 may be generated as difference data that indicates as a difference the modification content of the road characteristic that is modified in units of predetermined sections (see FIG. 3), and the map updating unit 17 may be configured to execute the update process as a difference update process in accordance with this difference data. Alternatively, instead of difference data, the update data 64 may include all map data after a modification, and the map updating unit 17 may execute the update process by replacing all of the map data 34 stored in the map database 31 with the update data 64.

(2) It is explained in the above embodiment that, based on the position information 35b included in the evaluation information 35, the determination unit 19 extracts the evaluation information 35 for the point that is included in the region where the map data 34 is updated, and determines whether the changed road characteristic information invalidates the evaluation result for the extracted evaluation information 35. However, the embodiments of the present invention are not limited to this example. Namely, rather than extracting the evaluation information 35 for points that are included in the region where the map data 34 is updated the determination unit may instead determine whether the modification of the road characteristic information invalidates the evaluation results of all the evaluation information 35.

(3) It is explained in the above embodiment that the determination unit 19 extracts the evaluation information 35 that is acquired during a period between the time when the road characteristic is modified and the time when the map data 34 is updated, and determines whether the changed road characteristic information invalidates the evaluation result of the extracted evaluation information 35. However, the embodiments of the present invention are not limited to this example. Namely, if the evaluation information 35 is acquired during the predetermined period before the map data 34 is updated, the determination unit 19 may extract the evaluation information 35 acquired between a specified amount of time (e.g. one week and changeable as necessary, likewise in the following descriptions) before the time the update data 64 can be acquired by the navigation device 1 (e.g., when the update data 64 is generated) and the time when the map data 34 is updated. Alternatively, the determination unit 19 may extract the evaluation information 35 acquired between a specified amount of time before the navigation device 1 acquires the update data 64 and the time when the map data 34 is updated. The determination unit 19 may also extract the evaluation information 35 acquired between a specified amount of time before the map data 34 stored in the map database 31 is updated by the map updating unit 17 and the time when the map data 34 is updated. According to these configurations, if the period between the modification of the road characteristic and the generation and distribution of the update data 64, the reception of the update data 64 by the navigation device 1, or the updating of the map data 34 is set in advance, evaluation information 35 generated during any of these periods is extracted. Therefore, in addition to analyzing for invalid evaluations, the necessary evaluation information 35 may be extracted in a sufficient amount and the processor load reduced.

(4) It is explained in the above embodiment that the driving evaluation unit 15 evaluates safe driving based on the driving conditions of the vehicle 3, with speed limit compliance, stop compliance, and deceleration before a curve used as the parameters. It is also explained in the above embodiment that the driving evaluation unit 15 evaluates environmentally friendly driving based on the driving conditions of the vehicle 3, with fuel efficient travel used as the parameter. However, the embodiments of the present invention are not limited to this example. In addition to the above example, sudden acceleration, sudden braking, sharp turning, following distance, use of headlights and the like may be used as parameters for safe driving. For environmentally friendly driving, revving of the engine, use of an optimum shift mode, idling and the like may be used as parameters. However, the analysis process executed by the analysis unit 18 only targets the evaluation information 35 for those parameters among these whose evaluation results are determined based on the relationship between the road characteristic information included in the map data 34 and the driving conditions of the vehicle 3.

Figure 10:
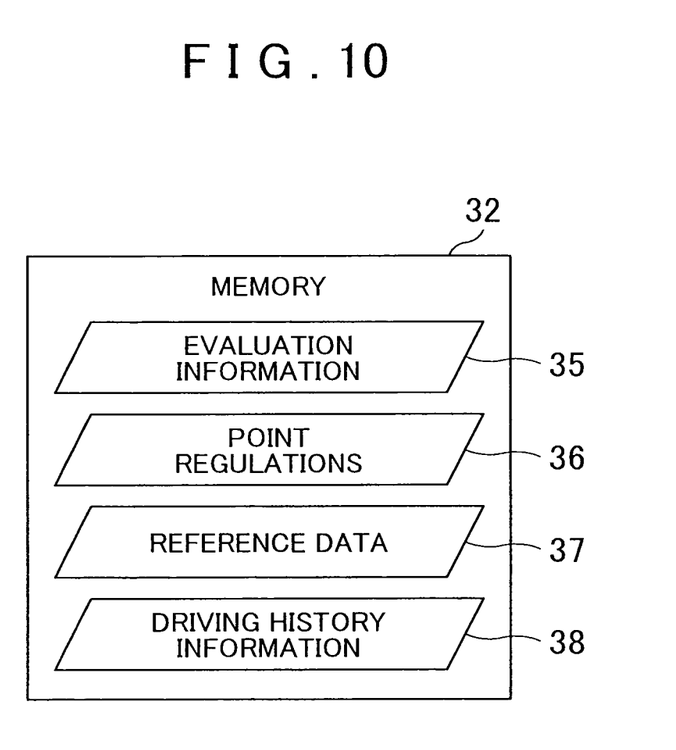
FIG. 10 is a block diagram that shows a configuration of the memory according to another embodiment of the present invention.

(5) It is explained in the above embodiment that when the determination unit 19 determines that the changed road characteristic information invalidates the evaluation result, the correction unit 20 selectively deletes the evaluation information 35 that includes this evaluation result from the memory 32. However, the embodiments of the present invention are not limited to this example. Namely, as shown in FIG. 10 for example, the driving conditions of the vehicle 3 is stored as driving history information 38 in the memory 32. If the determination unit 19 determines that the changed road characteristic information invalidates the evaluation result, the correction unit 20 may re-evaluate the driving conditions. The correction unit may then set a re-evaluation result that is based on this re-evaluation as the corrected evaluation result. In such case, the memory 32 serves as a driving history storage unit of the present invention. According to this configuration, the driving conditions are re-evaluated to acquire a corrected evaluation result. The evaluation information 35 in line with the actual driving conditions may thus be acquired after the fact and stored.

The processing content of the correction unit 20 for a specific example will be explained here based on FIG. 5 as an example. In this case, the correction unit 20 corrects the evaluation information 35 designated by the ID number "EEE" (see FIG. 7). Here, information on the driving conditions of the vehicle 3, which indicates the vehicle 3 traveled at a speed of 65 km/h on a road represented by the link k2 is stored in the memory 32 as the driving history information 38. If the determination unit 19 determines that the changed road characteristic information invalidates the evaluation result, the information serving as the driving history information 38, namely "the vehicle 3 traveled at a speed of 65 km/h on a road expressed by the link k2", is read out from the memory 32. Based on the driving history information 38 and the road characteristic information that includes the updated map data 34 (here, the maximum speed limit of 60 km/h), the correction unit 20 re-evaluates the driving conditions. In this example, speeding of 5 km/h is recognized based on the re-evaluation, and the evaluation result of a 1-point deduction is thus acquired. Next, "19:00, Aug. 9, 2008" is set as the evaluation timestamp 35a, "position coordinates $(x_5, y_5)$" as the position information, "speeding (5 km/h)" as the result information 35c, and "1-point deduction" as the point information 35d. This information is collectively indexed and then stored as new evaluation information 35 in the memory 32. In this case, the new evaluation information 35 may be stored by overwriting the content of the evaluation information 35 that is identified by the ID number "EEE", or stored as new evaluation information 35 that is identified by an ID number different from "EEE".

(6) As explained in the above embodiment, the navigation device 1 receives and acquires the update data 64 from the server device 2 by wireless communication via a wireless base station or the like. However, the embodiments of the present invention are not limited to this example. Namely, a configuration may be used where the update data 64 is acquired by reading out the update data 64 from a storage medium such as an optical disk or a magnetic disk in which the update data 64 is stored.

(7) The division of functions between the navigation device 1 and the server device 2 as described in the above embodiment is only an example, and the embodiments of the present invention are not limited to this example. Namely, aside from functional portions that must be provided on the navigation device 1 side, such as the host vehicle position information acquisition unit 12, each functional portion may be provided in either the navigation device 1 or the server device 2. Accordingly, for example, a configuration in which the entire structure of the driving evaluation system is provided in the navigation device 1 constitutes an embodiment of the present invention. In such case, the driving evaluation system is included in the navigation device 1. As another example, a configuration in which the main structure of the driving evaluation system is entirely provided in the server device 2 constitutes another embodiment of the present invention. In this case, the evaluation information acquisition unit 14, the memory 32, the map updating unit 17, and the analysis unit 18 are included in the main structure of the driving evaluation system.

[FIG. 1]
1/NAVIGATION DEVICE
2/SERVER DEVICE
11/TRANSMITTER-RECEIVER UNIT
41/GPS RECEIVER
42/DIRECTION SENSOR
43/DISTANCE SENSOR
12/HOST VEHICLE POSITION INFORMATION ACQUISITION UNIT
44/ACCELERATOR OPERATION AMOUNT SENSOR
45/BRAKE OPERATION AMOUNT SENSOR
46/VEHICLE SPEED SENSOR
13/DRIVING CONDITION ACQUISITION UNIT
21/NAVIGATION COMPUTATION UNIT
31/MAP DATABASE
34/MAP DATA
14/EVALUATION INFORMATION ACQUISITION UNIT
15/DRIVING EVALUATION UNIT
16/EVALUATION INFORMATION GENERATION UNIT
17/MAP UPDATING UNIT
18/ANALYSIS UNIT
19/DETERMINATION UNIT
20/CORRECTION UNIT
32/MEMORY
35/EVALUATION INFORMATION
36/POINT REGULATIONS
37/REFERENCE DATA

[FIG 2]
2/SERVER DEVICE
51/MAP DATABASE
61/MAP DATA
52/USER DATABASE
62/PERSONAL INFORMATION DATA
63/CUMULATIVE POINT DATA
53/TRANSMITTER-RECEIVER UNIT
54/UPDATE DATA GENERATION UNIT
64/UPDATE DATA
55/DISTRIBUTION PROCESSING UNIT
56/COUNT PROCESSING UNIT
4/AFFILIATED SERVICE PROVIDER

[FIG. 4]
A/LINK NUMBER
B/NODE NUMBER
C/ROAD CLASS
D/ROAD LENGTH
E/ROAD WIDTH
F/SHAPE INTERPOLATION POINT
G/TRAFFIC REGULATION
H/MAXIMUM SPEED 50 KM/H
I/STOP POINT AT LINK END OF NODE n3 SIDE
J/MAXIMUM SPEED 60 KM/H

[FIG. 6]
A/LINK NUMBER
B/MODIFICATION TIMESTAMP
C/MODIFICATION CONTENT
D/TRAFFIC REGULATION
E/SHAPE INTERPOLATION POINT
F/MAXIMUM SPEED: 60 KM/H

[FIG. 7]
A/ID NUMBER
B/EVALUATION DATE/TIME
C/POSITION COORDINATES
D/PARAMETER
E/EVALUATION RESULT
F/SPEED LIMIT COMPLIANCE
G/DECELERATION BEFORE CURVE
H/STOP COMPLIANCE
I/SUDDEN ACCELERATION AVOIDANCE
J/SPEEDING (20 KM/H): 7-POINT DEDUCTION
K/EXCESSIVE SPEED AT CURVE ENTRY: 3-POINT DEDUCTION
L/STOP IGNORED: 5-POINT DEDUCTION
M/SUDDEN ACCELERATION: 2-POINT DEDUCTION
N/SPEEDING (15 KM/H): 5-POINT DEDUCTION

[FIG. 8]
DRIVING EVALUATION PROCESS
01/ACQUIRE DRIVING CONDITION OF VEHICLE
02/EVALUATE BASED ON PREDETERMINED CRITERIA
03/GENERATE AND STORE EVALUATION INFORMATION
END

[FIG. 9]
ANALYSIS PROCESS
11/UPDATE DATA FOR MAP DATA AVAILABLE?
12/UPDATE PROCESS
13/READ OUT EVALUATION INFORMATION
14/EVALUATION INFORMATION ASSOCIATED WITH UPDATED POINT AVAILABLE?
15/EXTRACT EVALUATION INFORMATION ASSOCIATED WITH UPDATED POINT
16/SELECT ONE QUANTITY OF EVALUATION INFORMATION

17/ACQUIRE EVALUATION TIMESTAMP, MODIFICATION TIMESTAMP
18/ACQUIRE POST-MODIFICATION, PRE-UPDATE EVALUATION INFORMATION?

What is claimed is:

1. A driving evaluation system for evaluating whether a driver's driving of a vehicle complies with driving evaluation parameters set for a road on which the driver is driving, and retroactively correcting the evaluation when the evaluation parameters are invalid because a characteristic of the road had changed before the evaluation and the evaluation parameters had not been updated to reflect the change, the system comprising:
 a memory that stores:
  map data including:
   a plurality of nodes that represent a plurality of intersections and a plurality of links connecting the nodes that represent sections of roads; and
   road characteristic information indicating characteristics of the links;
  driving evaluation parameters set for the links, the driving evaluation parameters being based on the road characteristic information and being usable to evaluate whether predetermined driving actions are complied with; and
  evaluation information collected during driving of the vehicle in the past indicating whether the driver complied with the driving evaluation parameters set for particular links, the particular links being constituent components of the roads on which the driver has driven, the evaluation information for each particular link including evaluation timestamp data indicating a time at which the evaluation information was collected; and
 a controller that is specifically configured to:
  acquire update data to update the stored map data, the update of the stored map data changing the stored road characteristic information, the update data including update timestamp data for each link having changed road characteristic information as a result of the update, the update timestamp information indicating a time at which the road corresponding to the link having changed road characteristic information was changed; and
  process the stored evaluation information to eliminate evaluation information that is based on invalid evaluation parameters by:
   identifying which of the particular links having stored evaluation information have road characteristic information that has changed as a result of the updating of the stored map data; and
   for each of the particular links having stored evaluation information that have road characteristic information that has changed as a result of the updating of the stored map data:
    accessing the evaluation timestamp data for the particular link;
    accessing the update timestamp data for the particular link; and
    when the evaluation timestamp data indicates that the evaluation information was collected after the update timestamp data indicates the road corresponding to the particular link was changed, retroactively correcting the evaluation information for the particular link.

2. The driving evaluation system according to claim 1, wherein
 the road characteristic is at least one of a road shape, a road class, and a traffic regulation for the road.

3. The driving evaluation system according to claim 1, wherein
 the evaluation parameters include at least one of a parameter pertaining to safety and a parameter pertaining to an environmental impact.

4. The driving evaluation system according to claim 3, wherein
 the parameter pertaining to safety is at least one of speed limit compliance, stop compliance, and deceleration before a curve.

5. The driving evaluation system according to claim 1, wherein, for each of the particular links having stored evaluation information that have road characteristic information that has changed as a result of the updating of the stored map data, the controller corrects the evaluation information for the particular link by deleting the evaluation information for the particular link.

6. The driving evaluation system according to claim 1, wherein:
 the evaluation information is determined by comparing a driving condition of the vehicle with the driving evaluation parameters set for the particular links;
 the stored evaluation information includes the driving condition of the vehicle for each of the particular links; and
 for each of the particular links having stored evaluation information that have road characteristic information that has changed as a result of the updating of the stored map data, the controller corrects the evaluation information for the particular link by re-evaluating the driving condition based on the changed road characteristic information included in the updated map data.

7. The driving evaluation system according to claim 6, wherein
 the driving condition of the vehicle is at least one of an accelerator operation amount, a brake operation amount, and a vehicle speed.

8. A driving evaluation method for evaluating whether a driver's driving of a vehicle complies with driving evaluation parameters set for a road on which the driver is driving, and retroactively correcting the evaluation when the evaluation parameters are invalid because a characteristic of the road had changed before the evaluation and the evaluation parameters had not been updated to reflect the change, the method comprising:
 accessing a memory that stores:
  map data including:
   a plurality of nodes that represent a plurality of intersections and a plurality of links connecting the nodes that represent sections of roads; and
   road characteristic information indicating characteristics of the links;
  driving evaluation parameters set for the links, the driving evaluation parameters being based on the road characteristic information and being usable to evaluate whether predetermined driving actions are complied with; and
  evaluation information collected during driving of the vehicle in the past indicating whether the driver camlied with the driving evaluation parameters set for particular links, the particular links being constituent components of the roads on which the driver has driven, the evaluation information for each particular link including evaluation timestamp data indicating a time at which the evaluation information was collected; and acquiring update data to update the stored map data, the update of the stored map data changing the stored road characteristic information included in the map data, the update data including update timestamp data for each link having changed road characteristic information as a result of the update, the update timestamp information indicating a time at which the road corresponding to the link having changed road characteristic information was changed; and processing the stored evaluation information to eliminate evaluation information that is based on invalid evaluation parameters by:

identifying which of the particular links having stored evaluation information have road characteristic information that has changed as a result of the updating of the stored map data; and for each of the particular links having stored evaluation information that have road characteristic information that has changed as a result of the updating of the stored map data:

accessing the evaluation timestamp data for the particular link;

accessing the update timestamp data for the particular link; and when the evaluation timestamp data indicates that the evaluation information was collected after the update timestamp data indicates the road corresponding to the particular link was changed, retroactively correcting the evaluation information for the particular link.

9. A non-transitory computer-readable medium that stores a computer-executable driving evaluation program for evaluating whether a driver's driving of a vehicle complies with driving evaluation parameters set for a road on which the driver is driving, and retroactively correcting the evaluation when the evaluation parameters are invalid because a characteristic of the road had changed before the evaluation and the evaluation parameters had not been updated to reflect the change, the program comprising:

instructions for accessing a memory that stores:

map data including:

a plurality of nodes that represent a plurality of intersections and a plurality of links connecting the nodes that represent sections of roads; and road characteristic information indicating characteristics of the links;

driving evaluation parameters set for the links, the driving evaluation parameters being based on the road characteristic information and being usable to evaluate whether predetermined driving actions are complied with; and evaluation information collected during driving of the vehicle in the past indicating whether the driver complied with the driving evaluation parameters set for particular links, the particular links being constituent components of the roads on which the driver has driven, the evaluation information for each particular link including evaluation timestamp data indicating a time at which the evaluation information was collected; and instructions for acquiring update data to update the stored map data, the update of the stored map data changing the road characteristic information included in the map data, the update data including update timestamp data for each link having changed road characteristic information as a result of the update, the update timestamp information indicating a time at which the road corresponding to the link having changed road characteristic information was changed; and instructions for processing the stored evaluation information to eliminate evaluation information that is based on invalid evaluation parameters by:

identifying which of the particular links having stored evaluation information that have road characteristic information that has changed as a result of the updating of the stored map data; and for each of the particular links having stored evaluation information have road characteristic information that has changed as a result of the updating of the stored map data:

accessing the evaluation timestamp data for the particular link;

accessing the update timestamp data for the particular link; and when the evaluation timestamp data indicates that the evaluation information was collected after the update timestamp data indicates the road corresponding to the particular link was changed, retroactively correcting the evaluation information for the particular link.

10. The driving evaluation system according to claim 1, wherein the road characteristic information comprises information indicating at least one of:

road class;
road length;
road width;
road shape; and
a traffic regulation.

11. The driving evaluation method according to claim 8, wherein the road characteristic information comprises information indicating at least one of:

road class;
road length;
road width;
road shape; and
a traffic regulation.

12. The non-transitory computer-readable medium according to claim 9, wherein the road characteristic information comprises information indicating at least one of:

road class;
road length;
road width;
road shape; and
a traffic regulation.

13. The driving evaluation system according to claim 1, wherein the controller is located within the vehicle.

* * * * *